March 4, 1969 NOBUTOSHI KIHARA ET AL 3,431,353

SINGLE MOTOR MAGNETIC TAPE RECORDING AND/OR REPRODUCING SYSTEM

Filed Aug. 26, 1965 Sheet 1 of 4

Inventors
Nobutoshi Kihara
Yuji Wada by

Attys.

Inventors
Nobutoshi Kihara
Yuji Wada
by
Attys.

Inventors
Nobutoshi Kihara
Yuji Wada
by
Attys.

Inventors
Nobutoshi Kihara
Yuji Wada
by
Attys.

3,431,353

SINGLE MOTOR MAGNETIC TAPE RECORDING AND/OR REPRODUCING SYSTEM

Nobutoshi Kihara, Tokyo, and Yuji Wada, Yokohama-shi, Japan, assignors to Sony Corporation, Tokyo, Japan, a corporation of Japan Filed Aug. 26, 1965, Ser. No. 482,783
Claims priority, application Japan, Aug. 28, 1964, 39/49,066
U.S. Cl. 178—6.6 8 Claims
Int. Cl. H04n 5/76; G11b 5/00

ABSTRACT OF THE DISCLOSURE

Recording and reproducing device having a rotating head, tape-drive means, and a single motor for rotating the same, control means for regulating the speed of rotation of said head comprising means for providing a reference signal, circuit means for comparing said reference signal with the speed of rotation of said head and for generating an error signal proportional to any difference between said signals, coupling means for connecting said head with said motor, brake means responsive to said error signal for selectively reducing the speed of rotation of said head, and said coupling means absorbing variations in the rate of rotation of said head due to said brake means.

This invention relates generally to a magnetic tape recording and/or reproducing device, and more particularly to a video tape recorder which incorporates a servo system for controlling the speed of the rotary magnetic head.

In the recording of video signals with a video tape recorder, the image signals can be recorded and reproduced on a magnetic tape by means of a high speed rotary magnetic head. The image signal can be recorded on the magnetic tape obliquely to the direction of travel of the tape and in the form of tracks. In systems of this type, it is necessary to provide a servo system for controlling the speed of the rotary magnetic head in order to assure that the head precisely scans the magnetic tracks on the tape.

Simplified video tape recorders preferably use a single drive motor in order to comply with requirements such as light weight, low size, low power consumption etc. The difficulty and disadvantages of such a system, however, is that where reels, capstan and a rotary head are simultaneously driven by a single drive motor, the servo control system is adversely influenced.

In view of the foregoing, it is the primary purpose of the present invention to provide a magnetic tape recording and/or reproducing device which overcomes the disadvantages of prior art devices of this type.

Another object of the present invention is to provide a magnetic tape recording and/or reproducing device with a servo control system of simplified design which utilizes only a single drive motor.

A further object of the present invention is to provide a magnetic tape recording and/or reproducing device with an improved servo control system for controlling the speed of rotation of the rotary magnetic head.

These and further objects, features and advantages of the invention will become apparent from a reading of the following detailed description of a preferred embodiment of the invention which is to be read in conjunction with the accompanying drawings wherein like components in the several views are identified by the same reference numerals.

Figure 5:
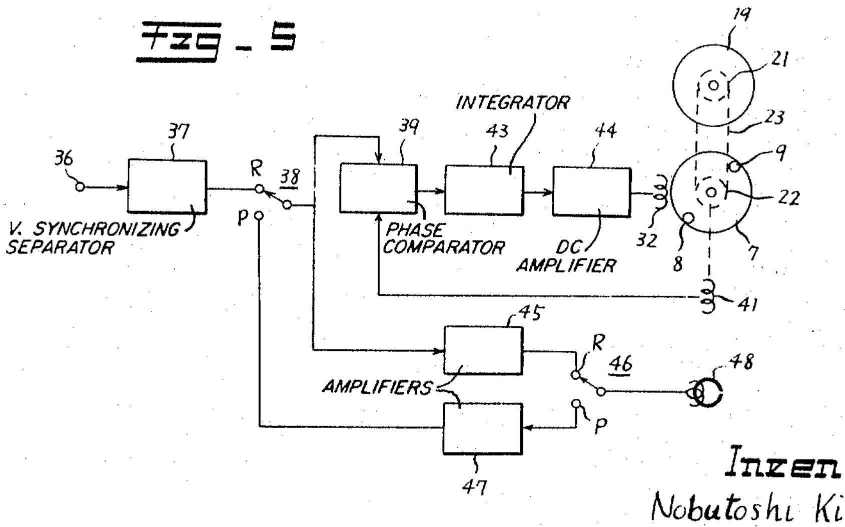
FIG. 5 is a block diagram that illustrates one embodiment of a circuit arrangement for the device of the present invention.
Figure 6:
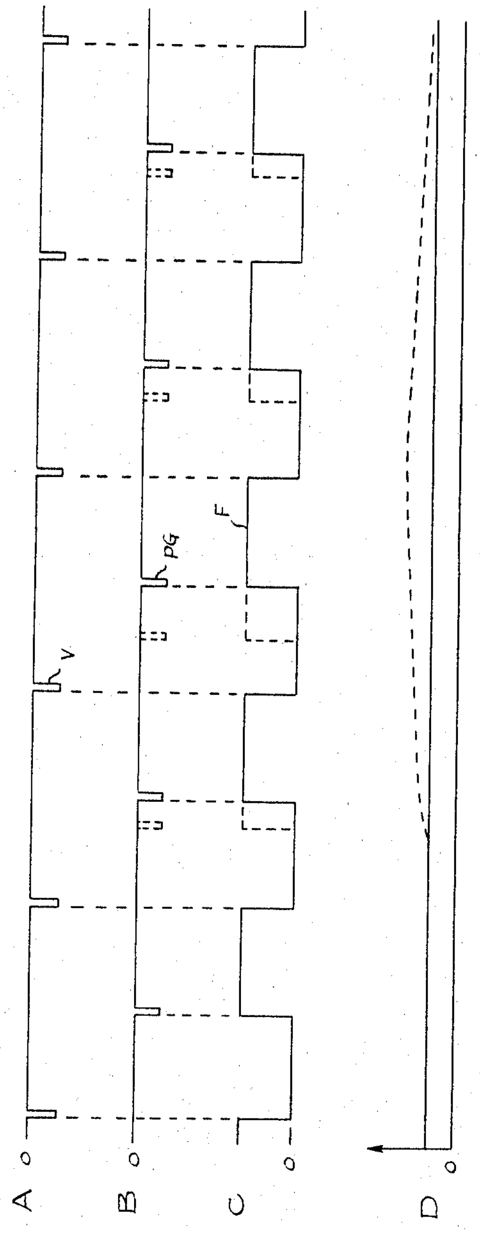
Figure 7:
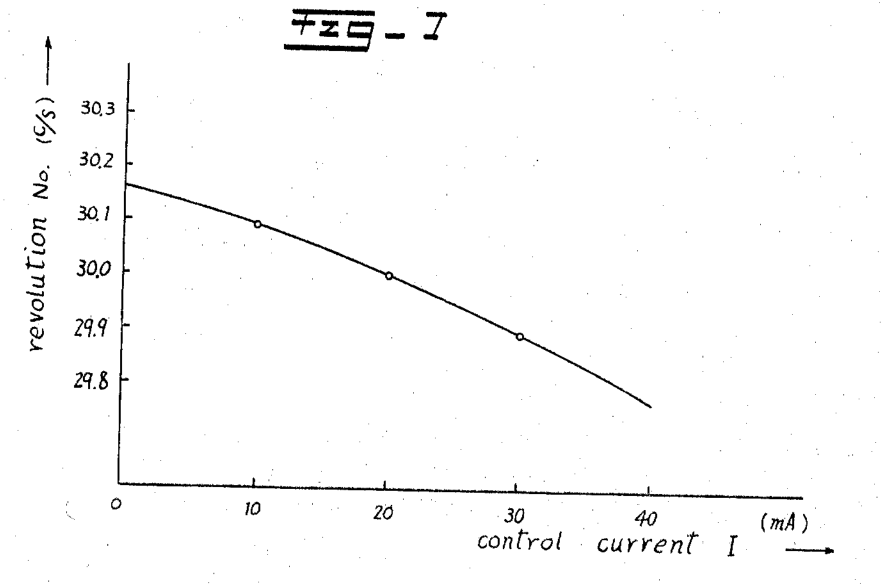
Figure 8:
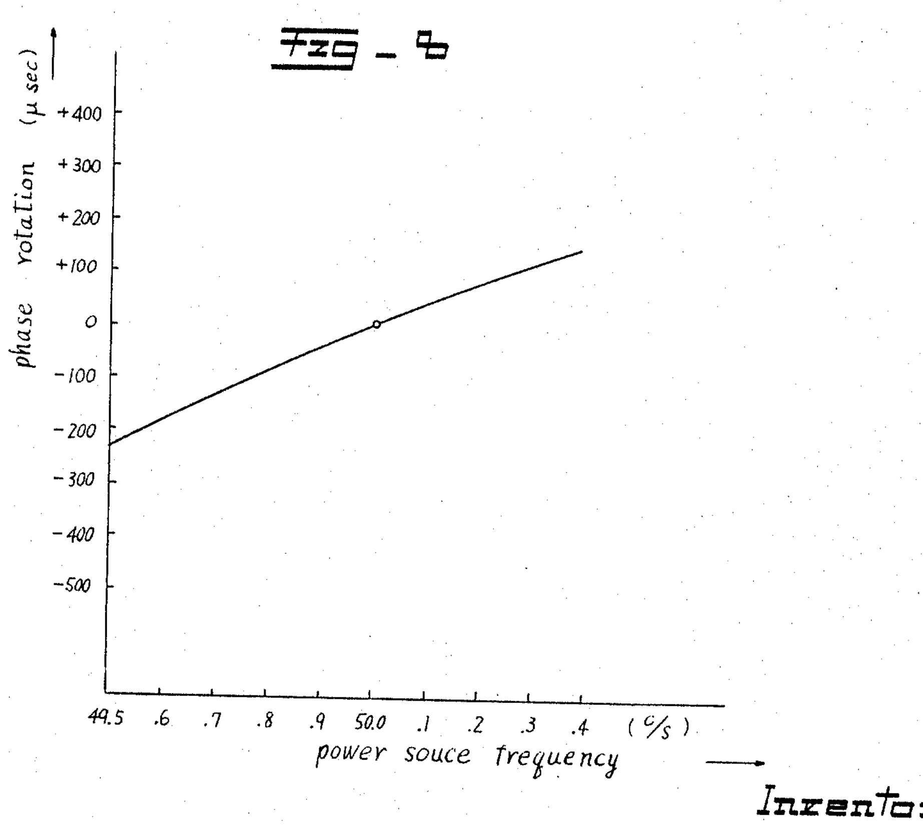

FIGS. 6*a* through 6*d* illustrate various voltage wave forms produced by the circuit illustrated in FIG. 5; and FIGS. 7 and 8 are characteristic curves obtained in the use of the present invention.

Briefly stated the present invention is directed to providing a simplified video tape recorder with an improved servo control system which permits the use of only one motor to drive both the rotary head and the capstan. This is accomplished by driving the rotary head at a speed slightly in excess of that required. In order to insure that the rotary head rotates at precisely the same speed both during recording and reproducing, the shaft of the rotary head is provided with a brake. During reproducing, the speed of the head is compared with a signal recorded during recording and the braking of the rotary head shaft is adjusted proportionally to any error signal.

Figure 1:
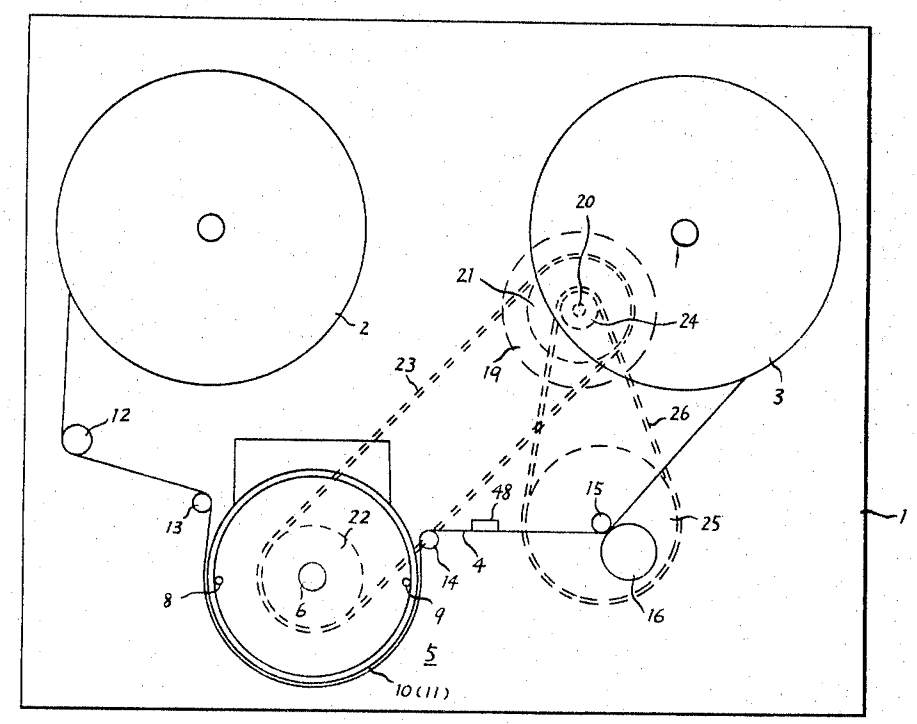
FIG. 1 is a plan view which schematically illustrates one embodiment of the magnetic tape recording and/or reproducing device of the present invention.
Figure 2:
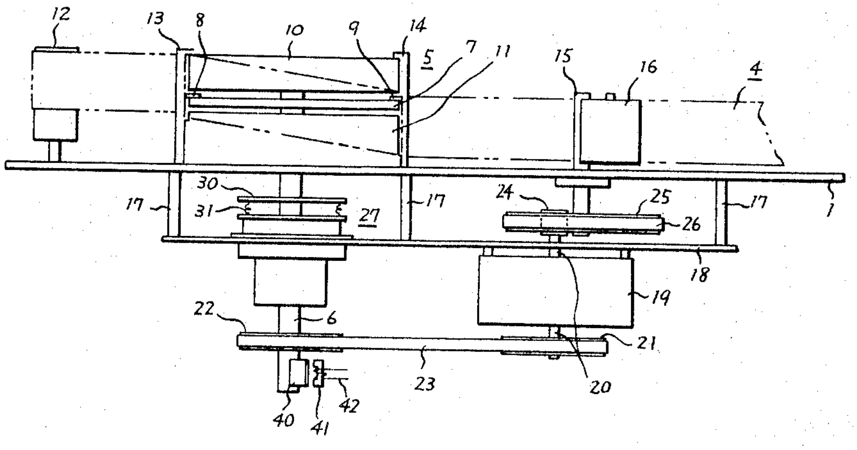
FIG. 2 is a front view of the device illustrated in FIG. 1.

Referring now to the figures and particularly to FIGS. 1 and 2 there is illustrated a portion of a video tape recorder which includes a chassis 1 upon which is mounted a supply reel 2 and a take-up reel 3. A rotary magnetic head assembly 5 is positioned between the supply and take-up reels 2 and 3 and in such position as to engage a magnetic tape 4 which passes by the head assembly 5 during its passage from the supply reel 2 to the take-up reel 3.

The rotary magnetic head assembly 5 as illustrated in FIGURES 1 and 2 includes the magnetic heads 8 and 9 which are disposed at spaced intervals about the periphery of a rotary disc 7. As illustrated in FIG. 2, the magnetic heads 8 and 9 are spaced at intervals of about 180 degrees about the peripheral edge of the rotary disc 7. The rotary disc 7 is attached to and is rotated by a rotary shaft 6. Positioned adjacent the periphery of the disc 7 are cylindrical tape guides 10 and 11 which are positioned substantially adjacent the outer circumference of rotation of the magnetic heads 8 and 9.

In operation, the magnetic tape 4 is fed from the supply reel 2 and is guided obliquely around the cylindrical tape guides 10 annd 11 over an angular range of approximately 180 degrees. The magnetic tape 4 is guided by guide rollers identified by the numerals 12, 13 and 14. The tape 4 is driven by engagement between a capstan 15 and a pinch roller 16 which are positioned between the rotary magnetic head assembly 5 and the take-up reel 3. The combination of the capstan 15 and the pinch roller 16 transports the tape 4 at a constant speed. A synchronizing control head 48 is positioned between the rotary magnetic head assembly 5 and the capstan 15 and engages the magnetic tape 4 for a purpose to be presently described.

Figure 3:
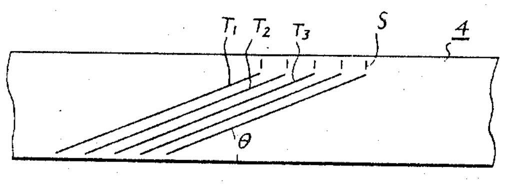
FIG. 3 is a plan view of a portion of a magnetic tape with the video tracks shown recorded thereon, the tracks being shown enlarged many times in order to explain the invention.

With the apparatus illustrated in FIGURES 1 and 2, tracks $T_1$, $T_2$, $T_3$, etc. are sequentially formed alternately by the magnetic heads 8 and 9 on the magnetic tape 4, the tracks being formed obliquely on the tape 4 at a predetermined angle $\alpha\theta$ with respect to the lengthwise direction of the tape 4. This is illustrated in FIG. 3. Video signals of one field or frame or its multiple are recorded along each of the tracks $T_1$, $T_2$, $T_3$, etc. and are reproduced therefrom in orderly sequence. Reference or standard signals S are recorded on the marginal edge of the magnetic tape 4, these signals for example, being vertical synchronizing signals. The signals S are recorded in the lengthwise direction of the magnetic tape 4 and are recorded and reproduced by the magnetic head 48.

The rotary shaft 6 and the capstan 15 are both driven by a single drive motor 19 which may be a synchronous motor or an induction motor. In accordance with the present invention, the rotary shaft 6 and the drive shaft 20 of the motor 19 are coupled together by means of a belt or idlers made of an elastic material, or an idler group in which slippage will occur between the contact surfaces. In the embodiment illustrated in FIG. 2, a subpanel 18 is mounted on the main chassis panel 1 by means of support members 17 and the motor 19 is then mounted on the panel 18. A pulley 21 is mounted on the drive shaft 20 of the motor 19 while a second pulley 22 is rotatably attached to the shaft 6 of the head 5. The pulleys 21 and 22 are interconnected by a belt 23 which is made from an elastic material. A pulley 24 is rotatably attached to the end of the drive shaft 20 spaced from the pulley 21 and on the opposite side of the motor 19 from the pulley 21. A fly wheel 25 is mounted on the shaft of the capstan 15 and the belt 26 is stretched between and interconnects the pulley 24 and the fly wheel 25 as can be seen from FIG. 1. This results in an arrangement in which the rotary shaft 6 and the capstan 15 are driven simultaneously by the single motor 19.

With the apparatus described and as illustrated in FIGS. 1 and 2, it is necessary that the belt 23 be elastic but it is not necessary that the belt 26 be elastic. The reason for this is that the belt 23 must prevent the servo control system from exercising any control or influence on the capstan 15 while it is exerting control on the rotary shaft 6. Due to the expansion in the lengthwise direction of the belt 23, or the slippage of the idlers, the speed of rotation of the drive shaft 20 is not affected by differences in the rate of rotation of the rotary shaft 6, the rate of rotation of the rotary shaft 6 varying with the application and removal of braking force. In general, the belt 23 is smaller in cross section and softer than the belt 26. It is preferred that the belt 23 be as long as possible.

In accordance with the present invention, the rotary shaft 6 is driven at a higher speed than the predetermined or desired speed, and a braking force is accordingly always applied to the rotary shaft 6 by means of an electric or mechanical braking device designated in general by the numeral 27. By means of the braking device 27, the speed of the rotary shaft 6 is reduced to a predetermined or desired rate of rotation.

Figure 4:
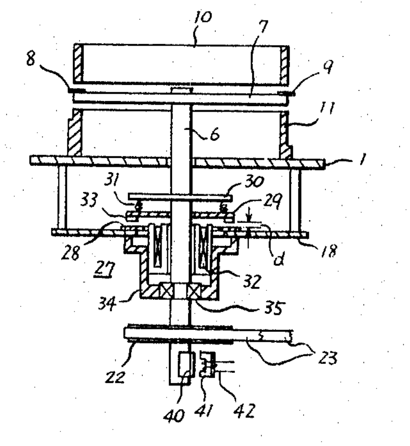
FIG. 4 is an enlarged view of a portion of the device illustrated in FIG. 2; and illustrating one of the essential components of the device of the present invention.

One embodiment of the braking device 27 is illustrated in FIGS. 2 and 4. The stationary disc 28 is mounted on the inner surface of the subpanel 18 and a movable disc 29 of magnetic material is loosely mounted on the rotary shaft 6 in opposing relation to the stationary disc 28. The movable disc 29 is accordingly adjacent to but spaced from the stationary disc 28. The moving disc 29 is supported by springs 31 which are attached to disc 30 that is secured to the shaft 6. The surface of the movable disc 29 opposite the stationary disc 28 has mounted thereon a friction disc 33. The friction disc 33 may, for example, be made of a felt material which will have a frictional effect on the moving disc 29 when engaged thereby. The friction disc 33 is spaced from the stationary disc 28 but can move into and out of engagement with the stationary disc 28. An electro magnetic device 32 is disposed about the periphery of the rotary shaft 6 on the side of the subpanel 18 removed from the moving disc 29. In this manner, the moving disc 29 can be attracted to the electro magnetic device 32 and in the process thereof the friction disc 33 engages the stationary disc 28 and thereby applies a braking force to the rotary shaft 6. The rotary shaft 6 is journaled by a ball bearing 35 which is supported in the bottom of a bracket 34 which is mounted on the subpanel 18.

The degree of braking applied to the shaft 6 is controlled by the servo control system of the present invention. The manner in which the servo control system operates is as follows. During recording the electromagnetic device 32 is actuated by an error signal which is a composite of a synchronizing signal in the video signal and a comparison signal corresponding to the rotary speed of the rotary shaft 6. As illustrated in FIGURE 5, the video signal output from a video signal source 36 is supplied to a vertical synchronizing signal separating circuit 37 and the output of the circuit 37 is applied to the phase comparator circuit 39 through a contact R for the recording setting of a changeover switch 38. At the same time, as illustrated in FIGURES 2 and 4, a magnet 40, which is located at a predetermined position on the rotary shaft 6, is positioned opposite a pickup head or pulse generator 41. The reference numeral 42 identifies the coil of a pickup head 41 which operates when the magnet 40 is opposite the head 41. In this position, a pulse signal is obtained and this comparison signal is applied to the comparator circuit 39 as illustrated in FIGURE 5. It can therefore be seen that both the comparison signal from the head 41 and the vertical synchronizing signal from the separating circuit 37 are applied to the phase comparator circuit 39. The output signal from the comparator circuit 39 is then applied to the electromagnetic device 32 of the braking device 27 through an integrating or filtering circuit 43 and a DC amplifier 44.

The phase comparator circuit 39 may, for example, be a flip-flop circuit. During recording a vertical synchronizing signal V of the video signal 36 serving as a reference signal is supplied to the magnetic head 48 through the amplifier 45 and the contact R of the recording switch 46. This signal is recorded by the head 48 on the marginal edge of the magnetic tape 4 in the lengthwise direction thereof as identified by the letter S in FIGURE 3. The recorded signal S is the reference signal.

During reproducing the recorded reference signal, S is reproduced by the magnetic head 48 and is applied to the comparator circuit 39 through the contact P of the switch 46, the amplifier 47 and the contact P of the switch 38. At the same time, the output from the pickup head 41 is also applied to the comparator circuit 39. As a result of this, an error signal is obtained from the comparator circuit 39 and is applied to the electromagnetic device 32 through the filter circuit 43 and the DC amplifier 44 in the same manner as during recording. During recording, the same result may be expected when pulse signals produced in the head 41 are utilized instead of using a vertical synchronizing signal as the reference signal.

The action of the servo control system is illustrated in the waveforms of FIGURE 6. In FIGURE 6A there is illustrated the vertical synchronizing signal V which is included in the video signal 36 as a reference signal. It is to be understood that the output signal from a specified reference signal generator may be employed in place of the vertical synchronizing signal V. In FIGURE 6B there is illustrated the output pulse signals PG from the head 41 which as explained above are synchronized and related to the rate of rotation of the rotary magnetic heads. FIGURE 6C illustrates the output signals from the phase comparator circuit 39 comprising the flip-flop circuit. The flip-flop circuit is reset by the signal V and is triggered for setting by the signal PG. As a result of this rectangular wave pulse, signals F are obtained as illustrated in FIGURE 6C.

The output rectangular wave pulse signals F are smooth by the integrating or filtering circuit 43 which has a suitable time constant, and the signal is subsequently amplified by the DC amplifier 44. In FIGURE 6D there is illustrated the output of the amplifier 44 which is the control current for the electromagnetic device 32. As illustrated in FIGURE 6, the pulse wave forms PG which are solid lines, illustrate the case where the rotary heads 8 and 9 rotate at normal speed. If, however, the rate of rotation of the rotary heads 8 and 9 exceeds a pre-determined value, which may, for example, occur if the power source frequency of the drive motor rises, the pulse signals PG advance, as shown by the broken lines in FIGURE 6B, and the width of the output wave form F of the flip-flop circuit 39 increases, thereby resulting in an increase in the control current. When this occurs, the electromagnetic device 32 attracts the movable disc 29 and the friction disc 33 attached to the movable disc 29 moves towards and contacts the stationary disc 28 thereby producing a braking force on the stationary disc 28. This braking action is of course always present and is merely increased as the control current increases. In this manner, the rotational phase of the rotary magnetic heads 8 and 9 is adjusted to a predetermined value. It will be apparent from the foregoing that if the rotational phase of the rotary magnetic heads lag behind a predetermined value, the width of the output wave form F decreases and a reverse control operation is thereby obtained wherein the braking force is reduced.

As illustrated in the figures, the rotary shaft 6 is coupled to the shaft 20 of the motor 19 by a belt 23, or idlers, and the rotary speed of the rotary shaft 6 is slightly greater than a preset predetermined value when the braking device 27 is inoperative. In this condition, the rotary shaft 6 is constantly subjected to a braking force by the braking device 27 so that the shaft 6 rotates at a predetermined speed. The variations in the rotary speed of the shaft 6 is primarily absorbed by expansion of the belt 23 and accordingly the servo control system exerts no influence on the motor shaft. In this manner, the capstan 15 is not affected by any change in the rotary speed of the shaft 6 and the tape 4 accordingly continues to travel at a constant speed. It is to be understood that the braking device 27 may also take the form of a known eddy-current brake or the like.

In one form of the invention, the endless belt 23 is made of a synthetic rubber such as chloroprene WRT having a hardness of approximately 68 and which is 8 mm. in width, 0.7 mm. in thickness and has an inner diameter of 140 mm. It was found that when the shaft 6 revolved at a speed of 30.16 cycles per second with no braking force applied thereto, and the speed of the shaft 6 was reduced to a predetermined value of 30.00 cycles per second by applying a braking force thereto, the expansion rate in the length of the belt 23 varied from 0.9% to 1.3% of the entire length thereof and that substantially no influence was exerted upon the speed of rotation of the motor shaft 20.

In FIGURE 7, there is illustrated the relationship between the control current I and the number of revolutions N of the rotary shaft 6 when the braking device of the present invention is utilized. FIGURE 8 illustrates the relationship between variations in the power source frequency $f$ of the drive motor and those in the rotational phase $\Delta\phi$ of the rotary magnetic heads. With the apparatus of the present invention, a conventional commercial power source can be supplied directly to the motor without the necessity of attaching a power amplifier thereto since the servo loop is not provided for the motor 19. In this manner, the entire device can be simplified and particularly the capstan since both the capstan and the rotary magnetic heads can be driven by a single motor. In accordance with this invention, recording and reproducing can be accomplished in a more stable manner.

It is to be understood that the invention has been described in connection with an application where a servo system is utilized for controlling the speed of rotation of the rotary shaft which drives the magnetic heads, but it will be apparent that the present invention can also be applied to the control of the rotary speed of the capstan. These and other modifications and variations may be affected without departing from the scope of the novel concepts of this invention and resort should be had to the appended claims for the scope of the invention.

What is claimed is:

1. A recording and reproducing device having a rotating head and a motor for rotating said head wherein control means regulate the speed of rotation of said head, said control means comprising a reference signal, circuit means for comparing said reference signal with the speed of rotation of said head and for generating an error signal proportional to any difference between said signals, coupling means for connecting said head with said motor, brake means responsive to said error signal for selectively reducing the speed of rotation of said head, and said coupling means absorbing variations in the rate of rotation of said head due to said brake means.

2. A magnetic tape recording and reproducing device having a rotating head, a tape transport means for transporting tape past said head for recording signals on and reproducing signals from said tape, and a motor for rotating said head wherein control means regulate the speed of rotation of said head, said device comprising a reference signal, translating means for generating an electrical signal proportional to the speed of rotation of said head, circuit means for comparing said reference signal with said electrical signal and for generating an error signal proportional to any difference between said signals, coupling means for connecting said head with said motor, brake means responsive to said error signal for selectively reducing the speed of rotation of said head, and said coupling means absorping variations in the rate of rotation of said head due to said brake means.

3. A magnetic tape recording and reproducing device comprising a rotary head, magnetic tape, tape transport means for transporting said tape past said head for recording signals on and reproducing signals from said tape, a single motor for driving said head and said tape transport, a reference signal, translating means for generating an electrical signal proportional to the speed of rotation of said head, circuit means for comparing said reference signal with said electrical signal and for generating an error signal proportional to any difference between said signals, and brake means responsive to said error signal for selectively reducing the speed of rotation of said head.

4. A magnetic tape recording and reproducing device comprising a rotary head, magnetic tape, tape transport means for transporting said tape past said head for recording signals on and reproducing signals from said tape, a single motor for driving said head and said tape transport, a reference signal, translating means for generating an electrical signal proportional to the speed of rotation of said head, circuit means for comparing said reference signal with said electrical signal and for generating an error signal proportional to any difference between said signals, coupling means for connecting said head with said motor, brake means responsive to said error signal for selectively reducing the speed of rotation of said head, and said coupling means absorbing variations in the rate of rotation of said head due to said brake means.

5. A device in accordance with claim 4 for recording and reproducing video signals wherein the reference signal is a synchronizing signal contained in said video signal.

6. A device in accordance with claim 5 wherein said synchronizing signal is recorded on said tape.

7. A device in accordance with claim 4 wherein said coupling means is an endless rubber belt.

8. A device in accordance with claim 7 wherein said rotary head is driven by said motor at a speed in excess of a desired speed, said desired speed being maintained by said brake means applying a braking force to said head.

References Cited

UNITED STATES PATENTS 3,046,463 7/1962 Johnson ----------- 318—302

3,210,464 10/1965 Felgel-Farnholz ----- 178—6.6
3,213,204 10/1965 Okamura --------- 179—100.2

ROBERT L. GRIFFIN, *Primary Examiner.*

HOWARD W. BRITTON, *Assistant Examiner.*

U.S. Cl. X.R.

179—100.2